No. 875,831. PATENTED JAN. 7, 1908.
J. C. LONGSTREET.
PEA AND BEAN HARVESTER.
APPLICATION FILED OCT. 18, 1907.
3 SHEETS—SHEET 1.
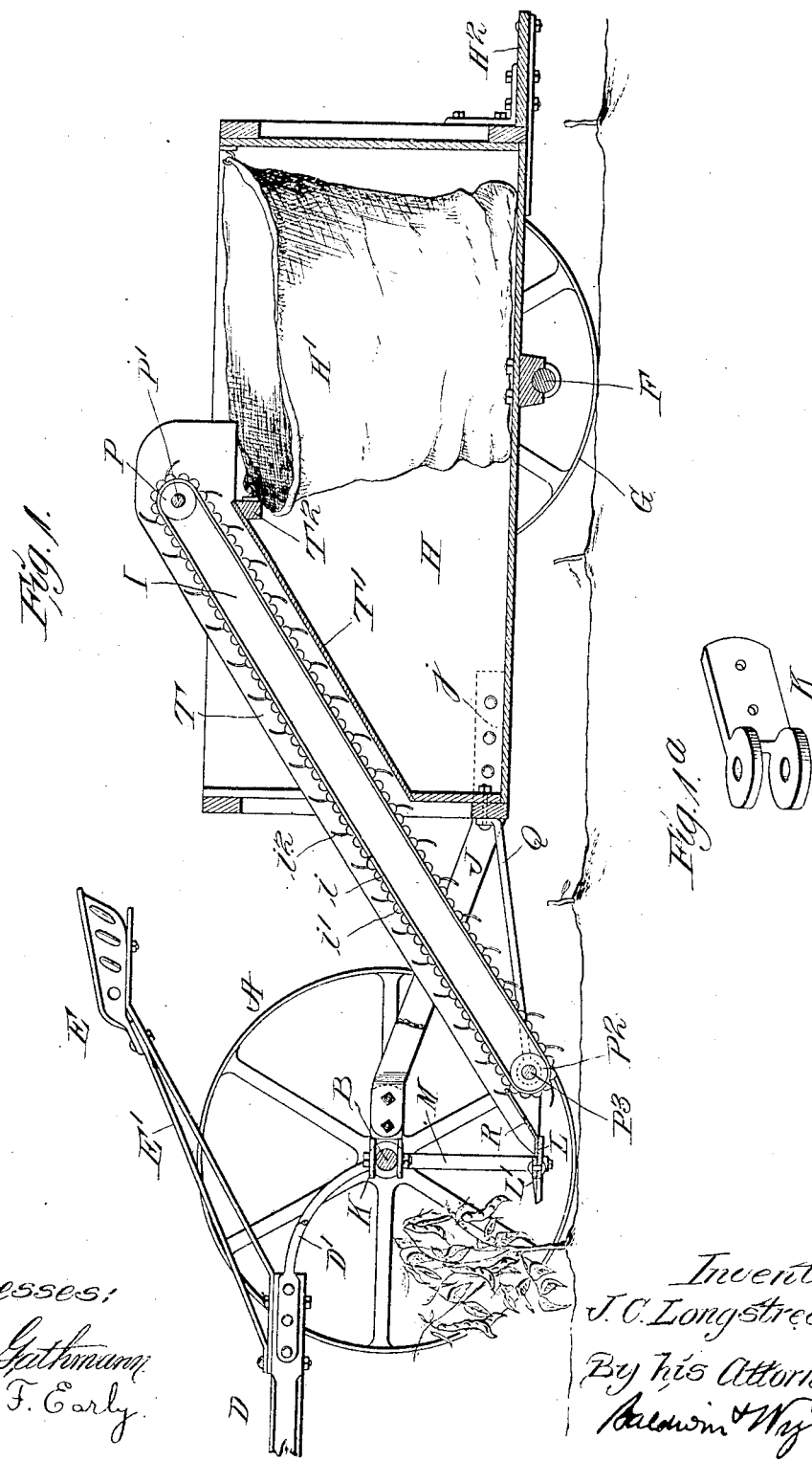

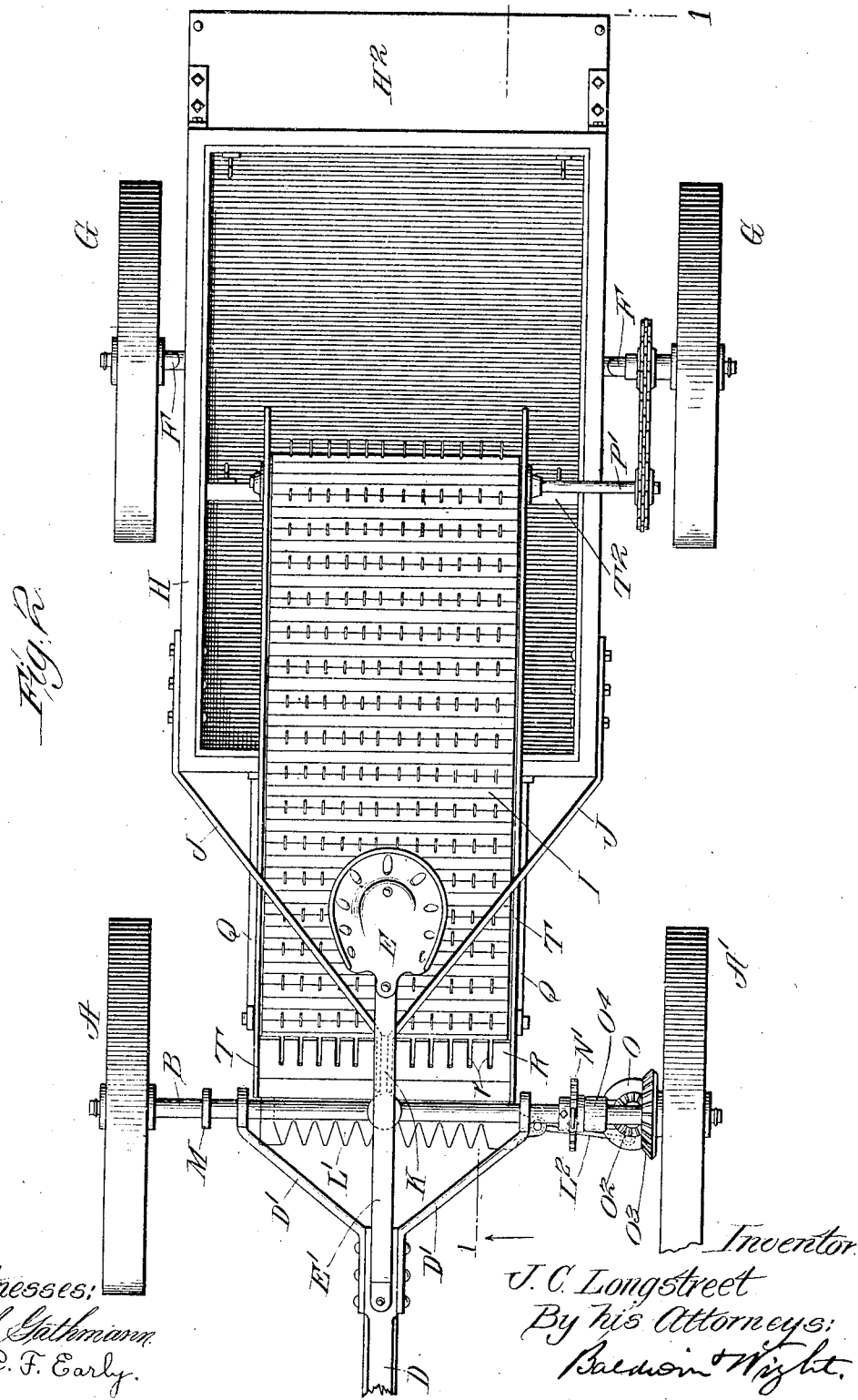

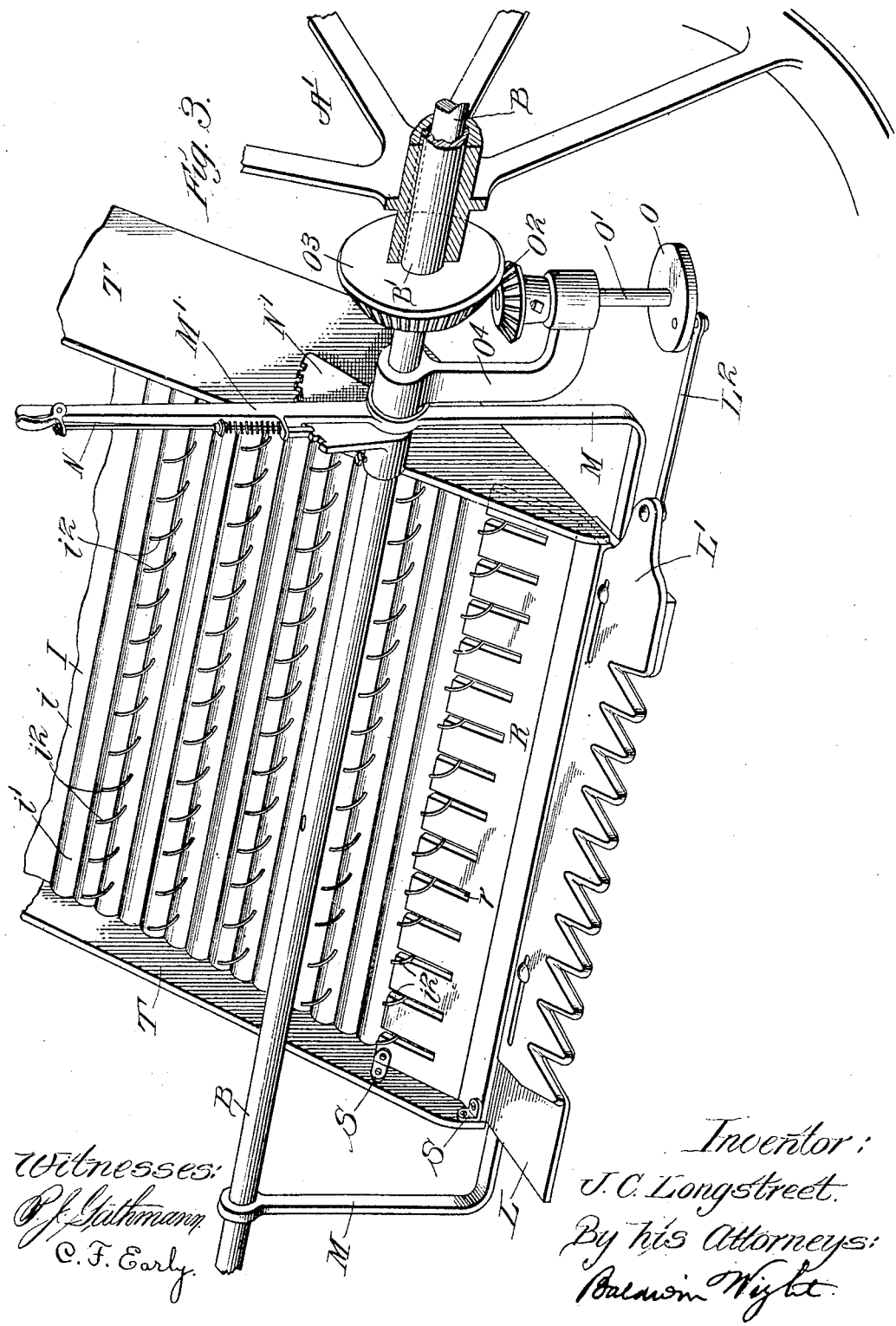

UNITED STATES PATENT OFFICE.

JAMES CARTER LONGSTREET, OF JACKSON, MISSISSIPPI.

PEA AND BEAN HARVESTER.

No. 875,831.  Specification of Letters Patent.  Patented Jan. 7, 1908.

Application filed October 18, 1907. Serial No. 397,986.

*To all whom it may concern:*

Be it known that I, JAMES CARTER LONGSTREET, a citizen of the United States, residing in Jackson, in the county of Hinds and State of Mississippi, have invented certain new and useful Improvements in Pea and Bean Harvesters, of which the following is a specification.

My improved harvesting machine is particularly adapted for cutting, collecting and transporting cow-peas so extensively grown in the Southern States. As is well known, the pods of the cow-peas of the South become very brittle and easily broken when the peas are mature. After the peas are cut and allowed to dry, the pods will be broken open very easily and often a large percentage of the peas are lost in handling. The cutting with a mower, the raking with an ordinary horse-rake, the tramping by the teams, and the handling with forks, all cause the pods to break and lose their contents.

The object of my invention is to provide a machine which will cut, gather and transport the peas with a minimum loss.

Pea and bean harvesters have, heretofore, been used in which the pea or bean pods are harvested without cutting down the plants or vines, and other machines have been tried in which the plant or vine is cut and conveyed to mechanism which separates the peas and beans from the pods and vines. I have found, however, that better results are obtained by cutting the plants or vines, gathering and storing them on the harvesting machine, transporting them away from the field, and subsequently separating the peas or beans from the plants, vines and pods in other machines.

I have provided a machine which is simple in construction and operation, which is adapted to cut the plants or vines close to the ground without injuriously shaking them or knocking them down so as to open the pods, and to convey them without loss to a receptacle or receptacles, in which the vines, plants and loose pods, peas or beans are stored for transportation to other machines for further treatment.

In my machine the driver's seat is supported on a tongue which is connected with the front axle between the front wheels by hounds of ordinary construction that hold the tongue well above the plane of the plants or vines. The cutting apparatus is similar to that used in ordinary mowing machines and is located between the front wheels close to the ground. The pitman which drives the cutter connects with a crank pin on a crank wheel arranged horizontally on a vertical shaft which is geared with one of the front wheels. By this arrangement I provide cutters which are sharp and powerful and sever the plants or vines without shaking out the peas or beans, and as the crank wheel is arranged horizontally I am enabled to locate the cutters close to the ground. The cutting apparatus is suspended from the front axle by hangers, and means are provided whereby the cutters may be swung up out of operative position. The rear axle is cranked and passes beneath a box or receptacle which may receive the cut vines, plants, etc., or it may contain bags for this purpose.

In order to automatically carry the plants, vines, etc., to the receptacle or to the bags, I provide an endless conveyer inclined from its lower end near the cutters to its upper end over the receptacle. This conveyer consists of a flexible belt carrying transversely arranged slats having rounded surfaces arranged close together and armed with fingers to engage the vines or plants. Between the lower end of the conveyer and the cutting apparatus is interposed an apron or plate which directs the vines, plants, etc., from the cutter to the conveyer and also prevents loose pods, peas, etc., from dropping in between the conveyer and cutter. The box or receptacle is connected with the front axle by hounds which have a detachable pivotal connection with the axle.

Other features of the invention will be hereinafter described.

In the accompanying drawings,—Figure 1 shows a vertical longitudinal section through my improved harvesting machine. Fig. 1ᵃ is a detail view in perspective showing the manner of pivotally connecting the hounds of the receiving box with the front axle. Fig. 2 is a top plan view of the machine. Fig. 3 is a perspective view on an enlarged scale showing the arrangement of the mechanism at the front end of the machine, and particularly the relation of the cutting apparatus with the conveyer.

One of the front wheels, A, is mounted to revolve directly on the axle, B, while the other front wheel, A', is attached to a sleeve, B'. The tongue, D, is connected with the axle, B, by hounds, D', which are curved upwardly and hold the tongue well above the plane of the vines or plants. It will be understood that the axle, B, does not rotate, the wheel, A, being mounted to revolve thereon, and that the wheel, A', is keyed to the sleeve, B' and the sleeve, B', rotates about the axle, B.

The driver's seat, E, is of ordinary construction and is mounted by means of supports, E', on the tongue, D. The rear axle, F, is cranked, the lower horizontal portion, shown particularly in Fig. 1, being arranged close to the ground, while the opposite ends of the axle are arranged at a suitable elevation to receive the rear wheels, G. This construction enables me to support the box or receptacle, H, by the rear wheels and to allow the bottom of the receptacle to come close to the ground so that the conveyer, I, need not be arranged on too steep an incline. The receptacle, H, may be constructed of wood or in any other suitable way, and is adapted to receive the cut vines, plants, etc., carried to it by the conveyer, I. If desired, sacks or bags, H', may be hung in the box or receptacle in such manner as to receive the vines etc. for convenience in handling. This method is preferred because when the vines, loose peas, pods, etc., are received by the box, the bags may be closed and no further handling is required until the bags are opened and the vines, pods, etc., are delivered to the separating machine, whereas if the vines, etc., were delivered to the receptacle further handling would be required.

A platform, H², is provided at the rear of the machine on which an attendant may stand. The box or receptacle, H, is connected with the front axle by means of hounds, J, which may be bolted to the sides of the box, as indicated at j, from which connection they extend forwardly and converge towards each other where they are bolted, as shown most clearly in Fig. 1ª, to a coupling, K, which is pivotally connected with the front axle, B. This pivotal connection is a detachable one so that, if desired, the rear portion of the machine may be separated from the front portion thereof, and the front wheels and parts connected therewith may be used independently on the rear portion of the machine.

The cutting apparatus is located between the front wheels and comprises cutters of the kind commonly employed in mowing machines, as such cutters are sharp and powerful and will cut the plants or vines without knocking them down or shaking off any of the pods or scattering the peas or beans on the ground. The stationary cutter plate, L, is suspended from the front axle by means of hangers, M, which are free to swing on the axle. A lever, M', extends upwardly from one of the hangers, M, and is provided with detent mechanism, N, connecting with a segment of teeth, N', rigidly attached to the axle. By this mechanism the hangers may be so connected with the axle as to hold the cutter plate, L, firmly in cutting position and by this means, also, as will hereinafter more clearly appear, the cutting apparatus may be swung upwardly out of operative position. The reciprocating cutter-bar, L', is connected by means of a horizontally arranged pitman, L², with a horizontally disposed crank wheel, O, secured to a vertical shaft, O', carrying a pinion, O², meshing with a spur wheel, O³, rigidly attached to the sleeve, B'. The shaft, O', is supported by a hanging bracket, O⁴, connected with the axle, B, but free to swing thereon. This bracket is connected with the lever, M'. It will be understood that the revolution of the front wheel, A', transmits motion to the crank wheel, O, which in turn reciprocates the cutter-bar, L'. The backward movement of the lever, M', will not only cause the cutter-plate, L, to be elevated, but will also elevate the reciprocating cutter-bar, L', the bracket, O⁴, and parts connected therewith.

The conveyer, I, comprises a flexible endless belt, i, preferably of canvas to which are secured strips or slats, i', of wood, which are arranged close together and have rounded outer surfaces providing grooves between them. The slats are armed with fingers, i², adapted to engage the vines or plants with which they come in contact and insure their being carried upwardly by the conveyer to the receptacle at the rear of the machine. The upper end of the conveyer passes over a roller, P, carried by a shaft, P', geared, as shown in Fig. 2, to one of the rear wheels, G. The opposite or lower end of the conveyer passes over a roller, P², the shaft, P³, of which is supported by arms, Q, secured to the front of the box or receptacle, H, and extending forwardly therefrom in such manner as to hold the lower roller close to the cutting apparatus. There is, however, necessarily left a space between the lower front end of the conveyer and the cutting apparatus and it is necessary to make some provision for guiding the vines, pods, etc. over this space, otherwise the vines or plants might become entangled and choke the apparatus and some of the pods and peas would drop to the ground and be wasted. I have therefore provided an apron or plate, R, which may be attached to the rear portion of the stationary cutter plate, L, or it may be attached by means of angle irons and screws, as shown at S, Fig. 3, to the trough of the conveyer. In the latter case the plate or apron, R, is not moved when the cutting apparatus is elevated. In the former case it moves with the cutters when they are moved from operative position. As shown, the plate or apron is inclined upwardly from the cutters and projects a short distance over the lower end of the conveyer. It is slotted, as shown at r, to permit the fingers, $i^2$, to pass. The conveyer is preferably arranged to pass between side boards, T, and preferably a bottom board, T', is provided, the upper end of which is supported by a cross-piece, T², extending from one side of the box, H, to the other. The bottom board, T', extends from the cross-piece, T², which is arranged about midway between the front and rear ends of the machine to the front of the machine, as indicated in Fig. 1. If the bags or sacks, H', are not used and the vines, pods, etc. are delivered directly to the receptacle, H, they can be pushed, as they accumulate, to the front portion of the machine without coming in contact with the returning fingers of the conveyer. Without the use of the board, T', there would be liability of this being done.

It will thus be seen that I have provided a machine for harvesting peas, beans and the like which is simple in construction and operation, but which will cut and gather the peas or beans while still on the plants or vines without material loss or with a minimum of loss. Loose peas or beans are swept with the vines or plants over the apron R and fall into the grooves between the slats $i'$ and are carried to the receptacles, H.

I claim as my invention:

1. The combination of the front wheels and axle, reciprocating cutting apparatus suspended from the front axle, means for holding the cutting apparatus in working position and for raising and lowering it, a box or receptacle at the rear end of the machine for vines, etc., a slatted conveyer carrying vine-engaging fingers for conveying vines, etc. from the cutting apparatus to the box or receptacle, and a slotted plate or apron interposed between the lower end of the conveyer and the cutting apparatus.

2. A machine for harvesting peas or beans, comprising a box or receptacle for the cut vines or plants, the front wheels and axle, a detachable pivotal connection between the front axle and the box, and cutting apparatus suspended from the front axle and operated by one of the front wheels.

3. A machine for harvesting peas or beans, comprising a box or receptacle for the cut vines or plants, the front wheels and axle, a detachable pivotal connection between the front axle and the box, cutting apparatus suspended from the front axle and operated by one of the front wheels, and means carried by the front axle for elevating and depressing the cutting apparatus and for holding it in operative position.

4. A machine for harvesting peas or beans, comprising a box or receptacle for the cut vines or plants, the front wheels and axle, a detachable pivotal connection between the front axle and box, a stationary cutter bar, hangers suspending it from the front axle, a reciprocating cutter bar, a horizontally arranged crank wheel connected therewith, a vertical shaft on which the crank wheel is secured, gearing connecting this shaft with one of the front wheels, a hanger suspending the shaft from the front axle, and a lever connected with the stationary cutter bar and with the hanger for elevating and depressing the cutting apparatus.

5. A machine for harvesting peas or beans, comprising a box or receptacle for the cut vines or plants, the front wheels and axle, connections between the box and the axle, a cranked rear axle hind wheels carried thereby, cutting apparatus arranged between the front wheels, and a conveyer extending upwardly from the cutting apparatus to the box or receptacle comprising an endless flexible belt, transverse slats secured thereto having rounded outer surfaces arranged close together with grooves between the rounded surfaces and fingers projecting outwardly from the slats.

6. A machine for harvesting peas or beans, comprising a box or receptacle for the cut vines or plants, the front wheels and axle, connections between the box and the front axle, cutting apparatus suspended from the front axle between the wheels, a conveyer extending from the cutting apparatus to the box comprising an endless flexible belt, transversely arranged slats secured thereto and provided with outwardly projecting fingers, and a slotted plate or apron interposed between the cutting apparatus and the conveyer.

7. A machine for harvesting peas or beans, comprising a box or receptacle for the cut vines or plants, the front wheels and axle, connections between the front axle and the box, cutting apparatus carried by the front axle between the wheels, a conveyer extending from the cutting apparatus upwardly in an inclined direction through the front of the box, and a trough in which the conveyer is arranged comprising the side boards and a bottom part (T') extending from a point beneath the upper portion of the conveyer to the front wall of the box for the purpose specified.

In testimony whereof, I have hereunto subscribed my name.

JAMES CARTER LONGSTREET.

Witnesses:
 AMOS R. JOHNSTON,
 W. A. CHENEY.